April 29, 1924.
C. C. EDDY
1,492,022
PROTECTIVE SYSTEM FOR ELECTRICAL MACHINERY
Filed June 9, 1919
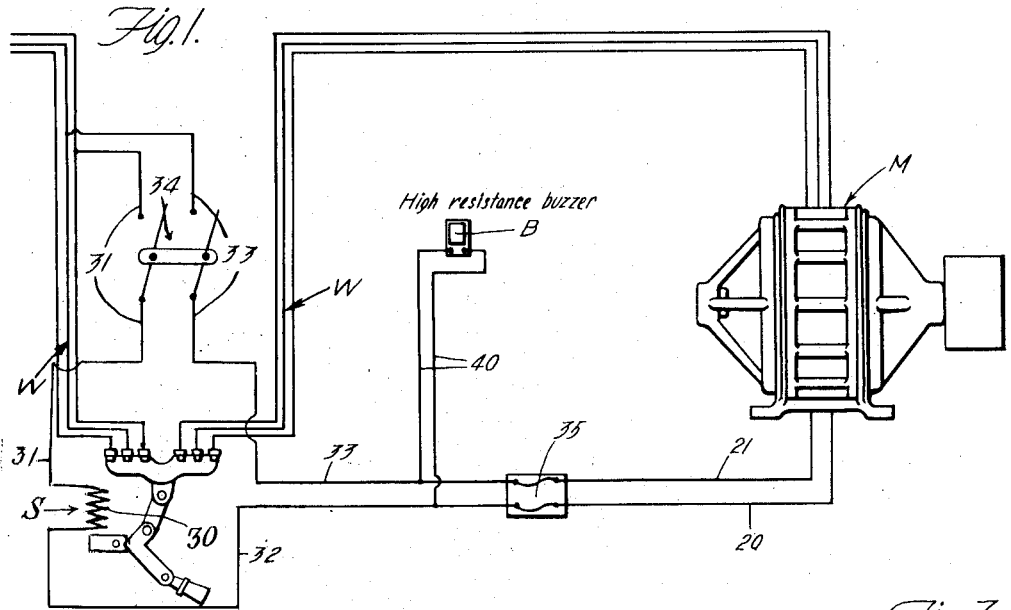
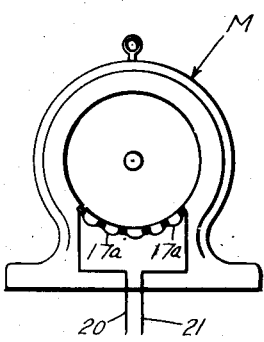
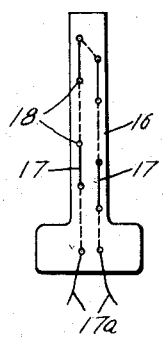
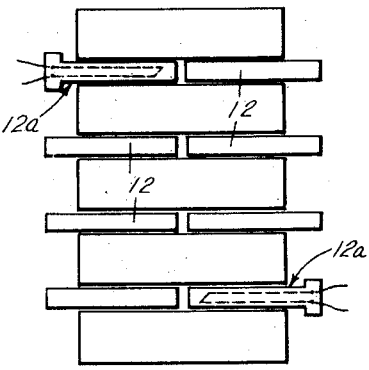
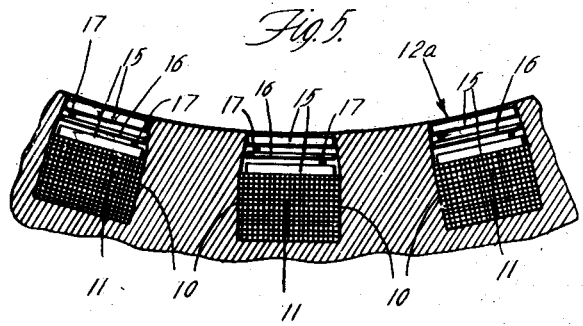
Inventor
Cecil Clement Eddy
by
*James T. Barkelew*
his Attorney.

Patented Apr. 29, 1924.

1,492,022

UNITED STATES PATENT OFFICE.

CECIL CLEMENT EDDY, OF LOS ANGELES, CALIFORNIA, ASSIGNOR OF ONE-HALF TO FRITZ W. FALCK, OF LOS ANGELES, CALIFORNIA.

PROTECTIVE SYSTEM FOR ELECTRICAL MACHINERY.

Application filed June 9, 1919. Serial No. 302,892.

*To all whom it may concern:*

Be it known that I, CECIL CLEMENT EDDY, a citizen of the United States, residing at Los Angeles, in the county of Los Angeles, State of California, have invented new and useful Improvements in Protective Systems for Electrical Machinery, of which the following is a specification.

This invention relates to protective systems or devices for electrical machinery, relating generally to protection of dynamo or motor machinery, or such machinery as rotary converters, etc.—in fact to all electrical machinery in which there is rotor and stator arrangement. In such machinery there is usually a very small clearance between the rotor and stator, and the small wearing of the bearing very often allows the rotor to come into physical contact with the stator, immediately developing intense heat which will usually cause great damage to the machine, burning out the coils and doing other damage. It is an object of this invention to prevent such damage to such machinery.

In providing such a system I prefer to make my system applicable of course to such installations as are now in common use; and so, without limiting myself thereto, I show my system in connection with the usual switch control system for such electrical machinery. For instance, as applied to a motor installation, I arrange my safety system in such a manner as to co-operate with the usual form of control switch, for allowing that control switch to shut off the current to the motor in case the rotor comes into contact with the stator. From a specific description of a typical form of such an installation, it will be readily apparent to those skilled in the art how my system may be applied to other installations.

Furthermore, there are a great many ways in which my system may be initially set in actuation; that is, there may be a great many different forms of devices which may be set in the motor or dynamo or other machine for the purpose of causing stoppage of the machine, in case the rotor comes into contact with the stator; but I herein show and describe specifically one preferred simple form of such device. This preferred form embodies a fusible current conductor which may be melted by the heat of friction immediately when the rotor comes in contact with the stator; and the break in circuit thus made causes the actuation of the main supply switch to cut off current to the motor. this specific form my device and system are very simple and may be very easily applied to electrical motor machinery of the class designated. Of course, in applying my invention to dynamo machinery other specific means must be used to cut off the driving energy from the machine; but my invention contemplates generally and broadly the cutting off of energy—the de-energization—of the machinery protected by my system.

With these preliminary observations in mind, the invention will now be best understood from the following detailed and specific description of a preferred form thereof, reference for this purpose being had to the accompanying drawings, in which—

Fig. 1 is a diagram showing the general arrangement of my system; Fig. 2 is a diagram showing the general electrical connections of the control devices which are placed in the machine itself; Fig. 3 is an enlarged plan showing the pole faces of the stator as equipped with my devices; Fig. 4 is a plan of one of the devices itself; and Fig. 5 is an enlarged section showing the placement of the control elements or devices in the stator.

Stators are usually provided with winding slots 10 in which the coils 11 are placed; and over these coils slot sticks 12 of fibre or the like are usually placed for the purpose of protecting the windings. In a preferred installation of my system I simply remove some of these slot sticks and insert my special slot sticks. My special slot sticks may be made as is best shown in Figs. 4 and 5; with outer strips 15 of fibre or similar substance and an intermediate strip or sheet 16 of fibre or of mica or some similar substance, a fusible conductor wire 17 being threaded back and forth through holes 18 in the strip 16. These wires come out of my special slot stick as shown at 17ª; and the wires of adjacent slot sticks may be connected together, so that the conductors of all these special slot sticks are in series; and then two connecting wires 20 and 21 may be run from the slot stick conductors thus connected in series. My special slot sticks, which I generally indicate by the numeral 12ª, may be placed in any desired position in the stator. Where the wear on the rotor bearings is downward, the slot sticks will be placed in the lower part of the stator; or where the wear on the bearings is in some other direction, due for instance to the pull of a belt on the rotor shaft, the slot sticks may be placed in any part or parts of the stator with which the rotor is liable to come into contact.

It will be readily understood that if the rotor comes into contact with the stator at any point, heat is immediately generated. In fact, this heat is usually so intense that the coils are immediately burned out. Now the fusible wire conductors 17 are made large enough so that they will pass the current which must be normally passed through them (for the purpose hereinafter described) without heating them to the melting point; but they are preferably made of a low melting material, so that immediately any heat is generated by contact of the rotor with the stator, these wires will immediately melt and will break the electric circuit. A melting of any one of the conductor wires 17 at any one point will of course break the circuit, as all these wires are in series.

At S I show a typical switch of a motor installation, controlling the main lead wires W which supply current to the motor M. Such a switch as shown at S may be of the type which, when thrown over to its position, in which it is supplying full current to the motor, is held in that position by an electro-magnetically actuated catch; and upon release of the catch a spring will throw the switch back to its "off" position. The catch which holds the switch in its "on" position is acuated by a magnet or solenoid 30. As long as this solenoid is energized, then the switch is held in its "on" position; but de-energization of this solenoid will immediately allow the switch to go back to its "off" position. This is a usual and ordinary construction and does not need to be here explained, in detail. The electro-magnet 30 is usually connected by wires into the main supply circuit; so that if for any reason the current in the main supply circuit fails, the control switch will be thrown to its "off" position. I connect my special stator stick 12ᵃ into this circuit, as will now be described. For instance, one side of the electro-magnet 30 may be connected by wires 31 with one of the feed wires W, and from the other side of the electro-magnet a wire 32 may lead to the wire 20 hereinbefore described. The wire 21 hereinbefore described may be connected with a wire 33 which connects with another one of the feed wires W. In the wires 31 and 33 there may be a small manually operable switch 34; and in the wires 32 and 33 there may be a fuse block 35 to prevent the passage of such a current as might fuse the conductor wires 17 of the slot sticks 12ᵃ. It will be apparent without further detailed description, that a melting of any one of the conductors 17 in any one of the slot sticks will break the circuit through the switch magnet 30 and will allow the switch to immediately go to its "off" position, cutting off the current to the motor. While the circuit is in this condition, it will be impossible to keep the motor running, because the magnet 30 cannot be energized, and hold the switch closed, until the circuit is repaired. Repair is easily effected by removing the injured slot stick and inserting a new one, or by replacing the melted wire in the slot stick.

At the same time that the switch S is operated by breaking of the circuit through the magnet 30, a buzzer or other signal may be operated to give a signal to the person in charge. For instance, I may use a high resistance buzzer B connected by wires 40 across the two wires 32 and 33. The resistance of buzzer B is high enough, and the resistance of the slot stick wires low enough, that, while the circuit is normally virtually shorted through the slot stick wires, buzzer B will not be operated. But immediately the circuit through the slot stick wires is broken, then the buzzer B will take current and will be operated; but the resistance in the buzzer B is so high that it will not pass current enough to energize magnet 30 sufficiently to cause it to hold the switch S in its "on" position.

Having now described a specific and preferred form of my protective system, it will be apparent to those skilled in the art how the system may be modified or varied to apply it to the different installations, and how the elements or devices of the system may be modified or varied to effect the same results in such various installations without departing from the scope of my invention. In fact, I do not consider my invention as at all limited to the particular things herein set forth, and I have made this specific description not at all for the purpose of limiting my invention thereto, but for the purpose of clearly explaining one practical form which my invention may take as applied to one kind of machinery of the general class to which my invention is applicable.

Having thus described a preferred form of my invention, I claim:

1. In a device of the character described, a slot stick embodying a body of electrical insulating material and a fusible wire extending through said body.

2. In a device of the character described, a slot stick, embodying a central sheet of electrical insulating material, a fusible wire threaded through said sheet, and side sheets of electrical insulating material—one on each side of the central sheet and the fusible wire.

3. In a device of the character described, an elongate body of insulating material adapted to be placed in a slot in one of the relatively rotating parts of a motor or the like, and a fusible conductor extending through said body.

4. In a device of the character described, an elongate body of insulating material adapted to be placed in a slot in one of the relatively rotating parts of a motor or the like, and a fusible conductor contained within and covered by the body.

In witness that I claim the foregoing I have hereunto subscribed my name this 26th day of May, 1919.

CECIL CLEMENT EDDY.

Witnesses:
  VIRGINIA I. BERINGER,
  W. H. MAXWELL.